United States Patent
Grall

(10) Patent No.: US 8,857,894 B2
(45) Date of Patent: Oct. 14, 2014

(54) VEHICLE CHASSIS FRAME SIDE RAIL OF IMPROVED CROSS SECTION

(75) Inventor: Loic Grall, Elancourt (FR)

(73) Assignee: Peugeot Citroen Automobiles SA (FR)

( * ) Notice: Subject to any disclaimer, the term of this patent is extended or adjusted under 35 U.S.C. 154(b) by 0 days.

(21) Appl. No.: 13/988,421

(22) PCT Filed: Nov. 23, 2011

(86) PCT No.: PCT/FR2011/052739
§ 371 (c)(1),
(2), (4) Date: May 20, 2013

(87) PCT Pub. No.: WO2012/080607
PCT Pub. Date: Jun. 21, 2012

(65) Prior Publication Data
US 2013/0241220 A1    Sep. 19, 2013

(30) Foreign Application Priority Data

Dec. 14, 2010 (FR) ..................................... 1060454

(51) Int. Cl.
| | | |
|---|---|---|
| *B62D 25/00* | (2006.01) | |
| *F16F 7/12* | (2006.01) | |
| *B62D 21/15* | (2006.01) | |
| *B60R 19/34* | (2006.01) | |

(52) U.S. Cl.
CPC ................ *B60R 19/34* (2013.01); *F16F 7/125* (2013.01); *B62D 21/152* (2013.01)
USPC ....... 296/187.03; 293/133; 280/784; 188/377

(58) Field of Classification Search
USPC .......... 296/204, 205, 187.09, 187.11, 203.01, 296/187.03; 280/784; 293/133; 188/377
See application file for complete search history.

(56) References Cited

U.S. PATENT DOCUMENTS

| | | | |
|---|---|---|---|
| 5,431,445 A * | 7/1995 | Wheatley .................... 280/784 |
| 7,185,945 B2 * | 3/2007 | Dandekar et al. ........ 296/187.09 |
| 2004/0201256 A1 * | 10/2004 | Caliskan et al. ......... 296/187.08 |
| 2005/0179268 A1 | 8/2005 | Kollaritsch et al. |
| 2007/0236025 A1 * | 10/2007 | Glasgow et al. .............. 293/133 |
| 2009/0026777 A1 | 1/2009 | Schmid et al. |
| 2010/0102592 A1 | 4/2010 | Tyan et al. |
| 2010/0276950 A1 | 11/2010 | Wang et al. |

FOREIGN PATENT DOCUMENTS

| | | |
|---|---|---|
| DE | 102007035483 A1 | 1/2009 |
| EP | 1970260 A2 | 9/2008 |
| WO | 2005120903 A1 | 12/2005 |

OTHER PUBLICATIONS

International Search Report from corresponding International Application No. PCT/FR2011/052739, mailed Mar. 1, 2012.

* cited by examiner

*Primary Examiner* — Joseph D Pape
(74) *Attorney, Agent, or Firm* — Polster Lieder

(57) ABSTRACT

The invention relates to a vehicle, notably a motor vehicle, chassis frame side rail made up of two section pieces of U-shaped cross section, welded together by longitudinal connecting tabs juxtaposed contiguously and more or less perpendicularly extending the ends of the branches of the U, in which each section piece has, between each of the tabs and the branches of the U that it extends, a joining area that forms two separate longitudinal plastic hinges that deform if the side rail is deformed by longitudinal compression so as to keep the welded joint between the tabs intact.

7 Claims, 2 Drawing Sheets

VEHICLE CHASSIS FRAME SIDE RAIL OF IMPROVED CROSS SECTION

CROSS-REFERENCE TO RELATED APPLICATIONS

The present invention is the U.S. national stage under 35 U.S.C. §371 of International Application No. PCT/FR2011/052739, which was filed on Nov. 23, 2011 and which claims the priority of application FR 1060454 filed on Dec. 14, 2010 the content of which (text, drawings and claims) is incorporated here by reference in its entirety.

FIELD

The present invention relates to the structure of a motor vehicle. More specifically, it relates to the vehicle chassis frame, the side rails of which are deformed when the vehicle is exposed to a frontal impact.

BACKGROUND

When a motor vehicle is exposed to a strong frontal impact, the front end portions of the side rails extending in the longitudinal direction of the vehicle are indeed deformed. In order to dissipate a large portion of the energy of the impact, it is preferable that this deformation occurs in the form of a longitudinal compression, or bunching, of the side rails, in which successive accordion folds form in planes perpendicular to the longitudinal direction of the side rails.

However, during the impact, a side rail commonly folds moving away from its longitudinal axis, a fold forming a vertical rotation axis between two portions of the side rail. In this case, the deformation absorbs a much smaller quantity of energy from the impact. The protection of the remainder of the vehicle, and particularly of the compartment in which the passengers are, is then decreased.

In order to stabilize the bunching of the side rails in the case of an impact, the shape and the size of these side rails are generally selected to confer a large amount of inertia to them, and to increase their transverse stiffness. However, these side rails with reinforced inertia in general have a greater weight and they take up more space than unreinforced side rails. The reinforcement thus generates an increase in the production cost of the chassis frames, an increase in the weight of the vehicle resulting in an increase in its fuel consumption, and a greater size making it more difficult to install the different components of the vehicle around the chassis frame.

Moreover, when the side rails are not sufficiently stiff transversely and risk undergoing deformation due to rotation around a folding line, these side rails are not sufficient to dissipate the energy of a frontal impact, which makes it necessary to consolidate the passenger compartment of the vehicle. The weight of the vehicle, and thus its fuel consumption, are then increased, as is its manufacturing cost.

SUMMARY

The present invention provides a remedy these disadvantages of the prior art.

In particular, the present invention provides a vehicle chassis frame, in particular for a motor vehicle, which allows considerable dissipation of the energy during a frontal impact of the vehicle.

Particularly, the invention provides a chassis frame which has a relatively small weight and space requirement in the vehicle, and which is inexpensive to manufacture.

These advantages, as well as others that will become more evident below, are achieved using a vehicle chassis frame side rail, in particular for a motor vehicle, consisting of two section pieces with U-shaped cross section, which are attached by welding longitudinal connecting tabs which are juxtaposed contiguously and which extend the branches of the U substantially perpendicularly, in which each section piece has, between each one of the longitudinal connecting tabs and the branches of the U that it extends, a joining area forming two separate longitudinal plastic hinges that undergo deformation when the side rail is deformed by a longitudinal compression, so as to keep the attachment by welding of the longitudinal connecting tabs intact.

Advantageously, each joining area consists of a curve having a radius greater than or equal to 12 mm, between the section piece portion forming the branch of the U and the longitudinal connection tab which extends it.

Advantageously, in various embodiments, the curve has a radius between 15 mm and 19 mm.

According to another possible embodiment, each joining area consists of a bevel between the section piece portion forming the branch of the U and the longitudinal connecting tab that extends it, the angle formed by the section piece portion forming the branch of the U and the bevel constituting one of the plastic hinges, and the angle formed between the bevel and the longitudinal connecting tab constituting the other plastic hinge.

Advantageously, in various embodiments, the side rail includes a plate attached to its end intended to be at the front of the vehicle, the two end edges of each tab of the same section piece being deformed in opposite directions with respect to each other at their attachment to the plate, in order to promote a deformation of the side rail by forming accordion folds in opposite directions at the two tabs, in the case of deformation by longitudinal compression.

Advantageously, in various embodiments, the attachment by welding of the tabs consists of a succession of welding points.

The invention also relates to a vehicle chassis frame, particularly for a motor vehicle, which includes two side rails, each one being as described above and extending longitudinally toward the front.

The invention also relates to a motor vehicle including such a chassis frame.

DRAWINGS

Other characteristics and advantages of the invention will become clearer when reading the following description of various illustrative and non-limiting embodiments.

DETAILED DESCRIPTION

At the time of a frontal impact of a motor vehicle, it is particularly important that the side rails forming the front of the chassis frame, which are stressed by a longitudinal compression, undergo symmetrical mode deformation, so that they are longitudinally crushed in an accordion like pattern, without moving away from their longitudinal axis. Such a deformation indeed makes possible an effective absorption of the energy of the impact.

To achieve this symmetrical mode deformation, it is generally necessary that the structure of the side rail is not torn by the deformation. For example, it is necessary for this deformation to occur without resulting in a rupture of the welds between the elements of the side rail.

Figure 1:
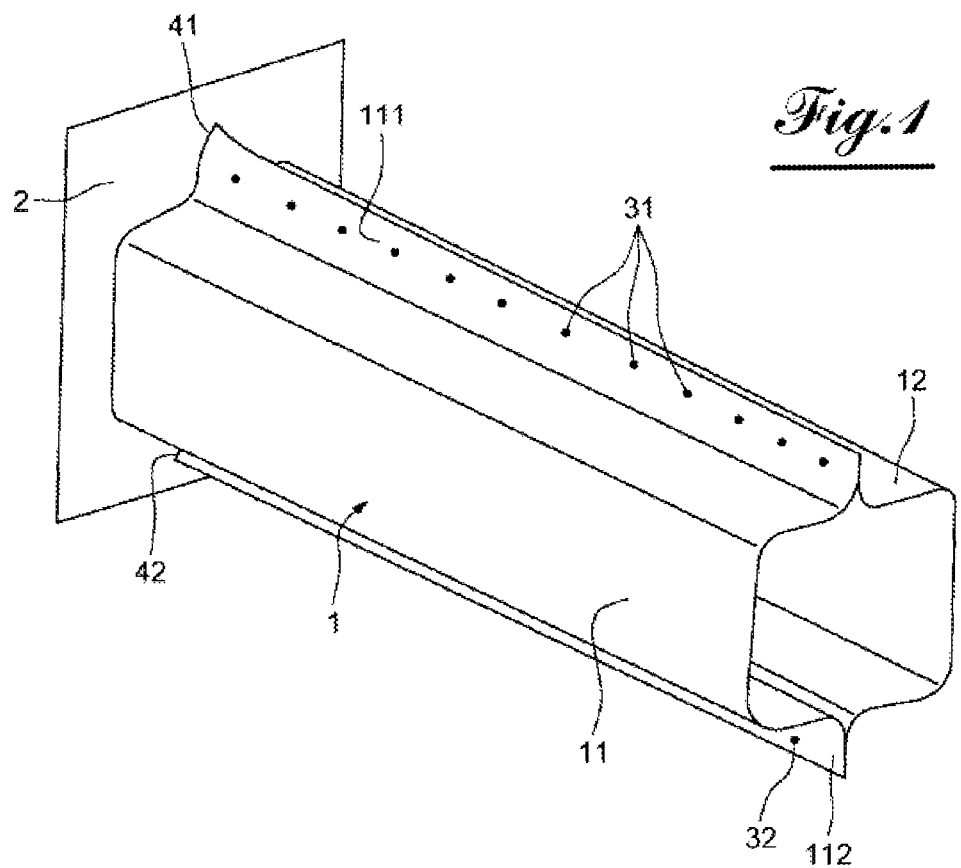
FIG. 1 is a perspective view of a side rail according to various embodiments of the invention.

FIG. 1 represents a side rail 1 forming the front of the chassis frame of a vehicle and ending with a plate 2. As shown in the cross section of FIG. 3, the side rail 1 is formed by two U-shaped section pieces, 11 and 12, respectively, assembled to each other by the welding points 31 formed between the upper longitudinal connecting tabs, 111 and 121, respectively, of the section pieces 11 and 12, and the welding points 32 formed between the lower longitudinal connecting tabs, 112 and 122, respectively, of the section pieces 11 and 12. The longitudinal connecting tabs 111, 121, 112 and 122 are juxtaposed contiguously to allow this welding to take place. On each section piece 11 and 12, these longitudinal connecting tabs 111, 121, 112 and 122 extend the ends of the branches 130, 132, 134 and 136 of the U formed by the respective section piece 11 and 12 substantially perpendicularly.

Figure 3:
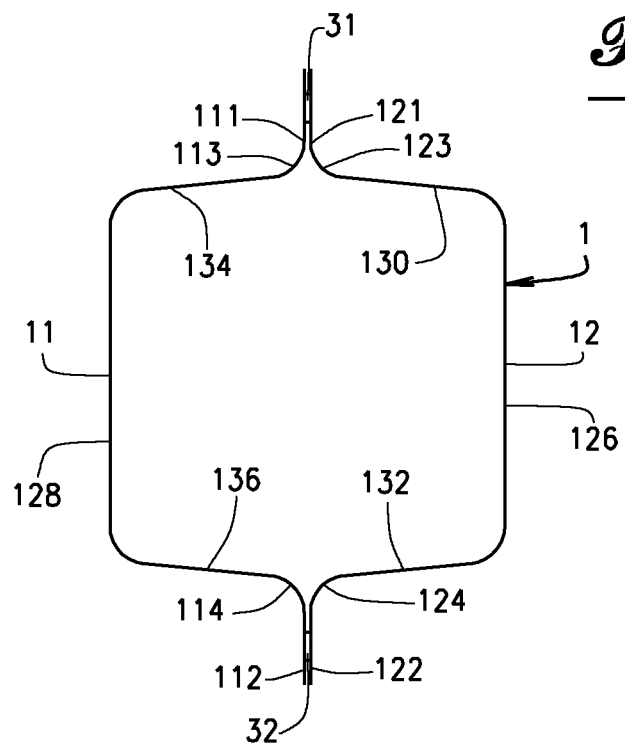
FIG. 3 is a cross section of the side rail of FIG. 1, in accordance with various embodiment of the invention.

As FIG. 3 shows, the U-shaped portions of each one of the section pieces 11 and 12 forming the side rail 1 are connected to the longitudinal connecting tabs 111, 112, 121 and 122, making possible the welding of the two section pieces 11 and 12, by the joining areas 113, 114, 123 and 124 consisting of curves having a large radius.

This radius of the curves of the joining area 113, 114, 123 and 124 are greater than or equal to 12 mm and can be on the order of 17 mm (±2 mm), thereby making it possible for the joining areas 113, 114, 123, and 124 to behave, during a deformation of the side rail 1, like an assembly of two plastic longitudinal hinges rather than a single hinge. The term "plastic hinge" denotes a folding line on which a plastic, and hence irreversible, deformation of the material occurs.

Figure 4:
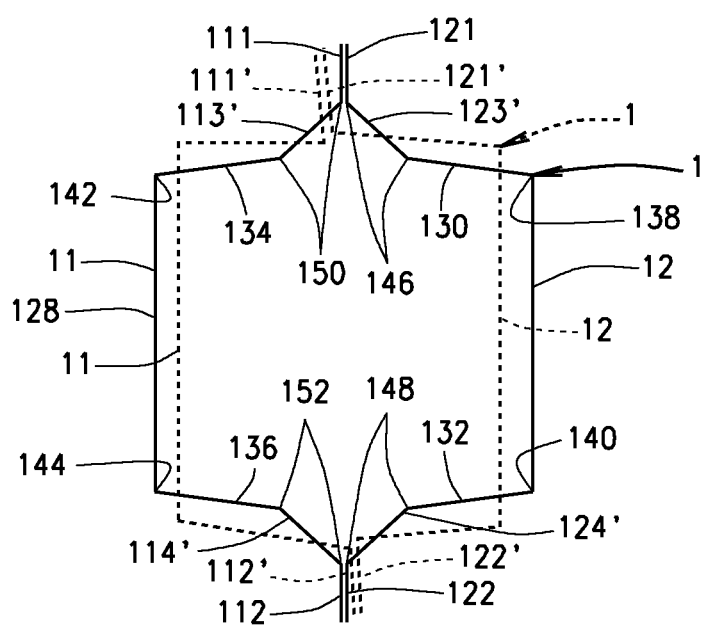
FIG. 4 is a diagrammatic cross section of the side rail of FIG. 1, before and after a frontal impact of the vehicle, in accordance with various embodiments of the invention.

FIG. 4 represents in a solid line drawing a simplified modeling of this cross section. As one can see in FIG. 4, the curves between the portions of the section pieces 11 and 12 that form bases 126 and 128 of the U shapes and the portions forming the branches 130, 132, 134 and 136 of the U shapes can each be modeled as a single hinge represented diagrammatically by angles 138, 140, 142 and 144. These curves indeed have a small radius, on the order of 6 mm.

On the other hand, the curves of the joining areas 113, 114, 123 and 124 having a large radius between the section piece portions forming the branches 130, 132, 134 and 136 of the U shapes and the longitudinal connecting tabs 111, 112, 121 and 122 are each modeled by two hinges, that is to say by two angles 146, 148, 150 and 152 separated by a metal sheet portion, also referred to as bevel portions 113,' 114', 123' and 124'. Indeed, the large radius of these curves makes possible the appearance in each one of two separate and parallel folding lines.

The presence of the two plastic hinges of each one of the joining areas 113 and 123 makes it possible, during the deformation of the side rail 1, to prevent the upper longitudinal connecting tabs, 111 and 121, respectively, from being moved apart from each other exerting traction on the welding points 31 that assemble them. Similarly, the presence of two plastic hinges of each one of the joining areas 114 and 124 makes it possible, during the deformation of the side rail 1, to prevent the lower longitudinal connecting tabs, 112 and 122, respectively, from being moved apart from each other exerting traction on the welding points 32 that assemble them.

Figure 2:
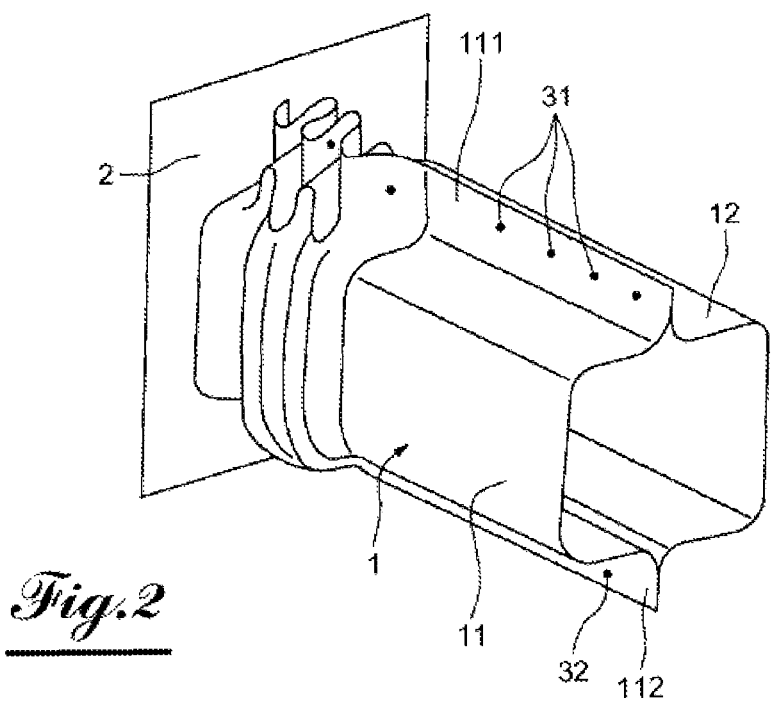
FIG. 2 is a perspective view of the side rail of FIG. 1 after a frontal impact of the vehicle, in accordance with various embodiments of the invention.

When the vehicle is exposed to a frontal impact, the side rail 1 is crushed as shown in FIG. 2. During this crushing, the cross section of the chassis frame changes from the cross section represented diagrammatically using a continuous line to the cross section represented diagrammatically with a dotted line in FIG. 4.

During the impact, the plastic hinges of the joining areas 113, 114, 123 and 124 enable a deformation of the side rail 1, having the effect of maintaining the longitudinal connecting tabs 111, 112, 121 and 122 one against the other, without exerting traction on the welding points 31 and 32 that connect them. The welding points 31 and 32 are thus kept intact, which prevents an asymmetric deformation of the side rail 1.

In the various embodiments represented, the joining areas 113, 114, 123 and 124 between the U-shaped portion of the section pieces 11 and 12 and the longitudinal connecting tabs 111, 112, 121 and 122 are produced by a curve of large radius. According to other possible embodiments of the invention, it would be possible to replace these curves of large radius of the joining areas 113, 114, 123 and 124 by the bevel-shaped connecting areas 113,' 114', 123' and 124' (shown in FIG. 4) having two angles, i.e., angles 146, 148, 150 and/or 152, each forming a plastic hinge, or by longitudinal weakened areas of the metal sheet of the section pieces 11 and 12, each forming a plastic hinge.

For the side rail 1 to be deformed in an accordion like pattern in longitudinal compression, it is important that, on a given cross section, the upper and lower longitudinal connecting tabs 111, 112, 121 and 122 are deformed by moving in different directions, some to the right and some to the left (shown in FIG. 2). Thus, in the representations drawn with dotted lines of the cross section of FIG. 4, the upper longitudinal connecting tabs 111 and 121 are moved to the left, identified in FIG. 4 as 111' and 121', when the lower longitudinal connecting tabs 112 and 122 move to the right, identified in FIG. 4 as 112' and 122'.

To start this deformation and thus ensure a correct longitudinal compression of the side rail 1, the upper and lower longitudinal connecting tabs 111, 112, 121 and 122, respectively, are inclined to the right and to the left, respectively, over the last centimeters at the front of the sidepiece. Thus, in FIG. 1, it is possible to see that the upper longitudinal connecting tabs 111 and 121 are inclined slightly to the right at the weld 41 of the end of these tabs to the plate 2. Similarly, the lower longitudinal connecting tabs 112 and 122 are inclined slightly to the left at the weld 42 of the end of these tabs to the plate 2.

What is claimed is:

1. A chassis frame side rail of a vehicle, said side rail comprising two opposing section pieces, each section piece having a U-shaped cross section, and a pair of opposing welding longitudinal connecting tabs that extend ends of a pair of opposing branches of the respective section piece substantially perpendicularly, the connecting tabs of the opposing section pieces welded together to attach the section pieces together, wherein each section piece further comprises:

a joining area formed between each one of the longitudinal connecting tabs and a respective one of the branches of the respective section piece that the respective connecting tab extends from, each joining area providing two separate longitudinal plastic hinges upon a longitudinal compressive impact to the side rail such that the side rail deforms in an accordion like manner so as to keep the attachment by welding of the longitudinal connecting tabs intact, wherein each joining area comprises a curve having a radius greater than or equal to 12 mm formed between the respective longitudinal connecting tab and the respective branch of the respective section piece.

2. The chassis frame side rail according to claim 1, wherein the curve has a radius between 15 mm and 19 mm.

3. The chassis frame side rail according to claim 2, wherein each curved joining area is replaced with a beveled section between the respective longitudinal connecting tab and the respective branch from which the respective connecting tab extends, wherein an angle formed between the respective branch and the bevel section provides one of the plastic hinges, and the angle formed between the bevel section and the respective longitudinal connecting tab provides the second plastic hinge.

4. The chassis frame side rail according to claim 1, further comprising a plate attached to an end of the side rail at an edge of an end of each longitudinal connecting tab, wherein the end edges of each opposing longitudinal connecting tab of the same section piece are deformed in an opposite direction with respect to each other at the attachment to the plate, such that deformation of the side rail is promoted by forming accordion folds in opposite directions upon the longitudinal compressive impact to the side.

5. The chassis frame side rail according to claim 1, wherein the attachment by welding of the longitudinal connecting tabs comprises of a plurality of welding points.

6. A chassis frame of a vehicle, said frame comprising:
two side rails, each side rail comprising:
two opposing section pieces, each section piece having a U-shaped cross section, and a pair of opposing welding longitudinal connecting tabs that extend ends of a pair of opposing branches of the respective section piece substantially perpendicularly, the connecting tabs of the opposing section pieces welded together to attach the section pieces together, wherein each section piece further comprises:
a joining area formed between each one of the longitudinal connecting tabs and a respective one of the branches of the respective section piece that the respective connecting tab extends from, each joining area providing two separate longitudinal plastic hinges upon a longitudinal compressive impact to the side rail such that the side rail deforms in an accordion like manner so as to keep the attachment by welding of the longitudinal connecting tabs intact, wherein each joining area comprises a curve having a radius greater than or equal to 12 mm formed between the respective longitudinal connecting tab and the respective branch of the respective section piece.

7. A motor vehicle, said motor vehicle comprising:
a chassis frame of a vehicle, said frame comprising:
two side rails, each side rail comprising:
two opposing section pieces, each section piece having a U-shaped cross section, and a pair of opposing welding longitudinal connecting tabs that extend ends of a pair of opposing branches of the respective section piece substantially perpendicularly, the connecting tabs of the opposing section pieces welded together to attach the section pieces together, wherein each section piece further comprises:
a joining area formed between each one of the longitudinal connecting tabs and a respective one of the branches of the respective section piece that the respective connecting tab extends from, each joining area providing two separate longitudinal plastic hinges upon a longitudinal compressive impact to the side rail such that the side rail deforms in an accordion like manner so as to keep the attachment by welding of the longitudinal connecting tabs intact, wherein each joining area comprises a curve having a radius greater than or equal to 12 mm formed between the respective longitudinal connecting tab and the respective branch of the respective section piece.

* * * * *